United States Patent
Chang et al.

(10) Patent No.: US 8,149,853 B2
(45) Date of Patent: Apr. 3, 2012

(54) ETHERNET WIDE AREA NETWORKS AND METHODS

(75) Inventors: Frederick Robert Chang, Austin, TX (US); Shih Chung Soon, Dublin, CA (US)

(73) Assignee: AT&T Labs, Inc., Austin, TX (US)

(*) Notice: Subject to any disclaimer, the term of this patent is extended or adjusted under 35 U.S.C. 154(b) by 0 days.

(21) Appl. No.: 12/605,117

(22) Filed: Oct. 23, 2009

(65) Prior Publication Data

US 2010/0103944 A1    Apr. 29, 2010

Related U.S. Application Data

(63) Continuation of application No. 11/359,822, filed on Feb. 22, 2006, now Pat. No. 7,633,951, and a continuation of application No. 10/141,370, filed on May 8, 2002, now Pat. No. 7,046,671.

(51) Int. Cl.
   *H04L 12/28* (2006.01)
   *H04L 12/56* (2006.01)
   *H04W 4/00* (2009.01)
   *G06F 15/173* (2006.01)

(52) U.S. Cl. ........ 370/401; 370/338; 370/389; 370/392; 709/223

(58) Field of Classification Search .......... 370/219–401; 709/223–245
   See application file for complete search history.

(56) References Cited

U.S. PATENT DOCUMENTS

| | | | |
|---|---|---|---|
| 5,426,637 A | 6/1995 | Derby et al. | |
| 5,430,728 A | 7/1995 | Narayanan et al. | |
| 5,436,902 A | 7/1995 | McNamara et al. | |
| 5,796,727 A * | 8/1998 | Harrison et al. | 370/338 |
| 5,818,619 A | 10/1998 | Medved et al. | |

(Continued)

FOREIGN PATENT DOCUMENTS

EP    0 603 100    6/1994

(Continued)

OTHER PUBLICATIONS

Suba Varadarajan, "Virtual Local Area Networks," retrieved from http://www.cis.ohio-state.edu/~jain/cis788-97/virtual_lans/index.htm on Feb. 7, 2000, last modified Aug. 14, 1997, 12 pages.

(Continued)

*Primary Examiner* — M. Phan
(74) *Attorney, Agent, or Firm* — Hanley, Flight & Zimmerman, LLC.

(57) ABSTRACT

Ethernet wide area networks and methods are disclosed. A disclosed example Ethernet wide area network includes a first network Ethernet switch having a first network interface and a first service interface. The first service interface is to communicate with a first local area Ethernet switch. The network also includes a second network Ethernet switch having a second network interface and a second service interface. The second service interface is to communicate with the second local area Ethernet switch. The network also includes a root node network Ethernet switch having a third network interface to communicate with the first network interface with the first network Ethernet switch and a fourth network interface to communicate with the second network interface of the second network Ethernet switch. The first, second, third and fourth network interfaces are to route packets from the first local area Ethernet switch to the second local area Ethernet switch without recognizing subscriber LAN MAC addresses associated with either the first or second local area Ethernet switches.

18 Claims, 6 Drawing Sheets

U.S. PATENT DOCUMENTS

| | | | |
|---|---|---|---|
| 5,818,842 | A | 10/1998 | Burwell et al. |
| 5,917,820 | A | 6/1999 | Rekhter |
| 5,936,963 | A | 8/1999 | Saussy |
| 5,978,373 | A * | 11/1999 | Hoff et al. .................... 370/392 |
| 6,047,325 | A | 4/2000 | Jain et al. |
| 6,061,728 | A | 5/2000 | Mead et al. |
| 6,141,126 | A | 10/2000 | Lahat et al. |
| 6,151,635 | A | 11/2000 | Bare |
| 6,178,462 | B1 | 1/2001 | Bass et al. |
| 6,181,695 | B1 | 1/2001 | Curry et al. |
| 6,222,848 | B1 | 4/2001 | Hayward et al. |
| 6,226,296 | B1 | 5/2001 | Lindsey et al. |
| 6,337,863 | B1 | 1/2002 | Nair et al. |
| 6,343,330 | B1 | 1/2002 | Khanna et al. |
| 6,389,023 | B1 | 5/2002 | Matsuzawa et al. |
| 6,424,650 | B1 * | 7/2002 | Yang et al. .................... 370/390 |
| 6,442,610 | B1 | 8/2002 | Khanna et al. |
| 6,490,292 | B1 | 12/2002 | Matsuzawa |
| 6,577,631 | B1 | 6/2003 | Keenan et al. |
| 6,591,303 | B1 | 7/2003 | Hendel et al. |
| 6,603,769 | B1 | 8/2003 | Thubert et al. |
| 6,704,326 | B2 | 3/2004 | Russell et al. |
| 6,847,620 | B1 | 1/2005 | Meier |
| 7,064,671 | B2 | 6/2006 | Vanderah et al. |
| 7,633,951 | B2 | 12/2009 | Chang et al. |
| 7,697,549 | B2 * | 4/2010 | Eran .............................. 370/401 |
| 2002/0027906 | A1 | 3/2002 | Athreya et al. |
| 2002/0101868 | A1 | 8/2002 | Clear et al. |
| 2002/0101875 | A1 | 8/2002 | Lui et al. |
| 2003/0131105 | A1 | 7/2003 | Czeiger et al. |
| 2005/0257039 | A1 * | 11/2005 | Marshall ........................... 713/1 |
| 2006/0039321 | A1 * | 2/2006 | Thawani et al. .............. 370/328 |
| 2007/0002833 | A1 * | 1/2007 | Bajic ............................. 370/352 |
| 2007/0204021 | A1 * | 8/2007 | Ekl et al. ...................... 709/223 |
| 2008/0240106 | A1 * | 10/2008 | Schlenk ........................ 370/392 |
| 2010/0165968 | A1 * | 7/2010 | Shpak ........................... 370/338 |

FOREIGN PATENT DOCUMENTS

| | | |
|---|---|---|
| WO | WO03096591 | 11/2003 |

OTHER PUBLICATIONS

Network World Fusion, "802.1Q," http://www.nwfusion.com/details/470.htm, copyright 1995-2003, retrieved Mar. 31, 2005, 2 pages.

International Search Report in corresponding PCT Application No. PCT/US03/13949, completed Sep. 4, 2003, mailed Dec. 5, 2003, 1 page.

United States Patent and Trademark Office, "Notice of Allowance and Fee(s) Due," issued in connection with U.S. Appl. No. 10/141,370, mailed Dec. 21, 2005, 10 pages.

United States Patent and Trademark Office, "Office communication," issued in connection with U.S. Appl. No. 10/141,370, mailed Aug. 4, 2005, 18 pages.

United States Patent and Trademark Office, "Office communication," issued in connection with U.S. Appl. No. 10/141,370, mailed Jul. 13, 2004, 15 pages.

United States Patent and Trademark Office, "Advisory Action Office communication," issued in connection with U.S. Appl. No. 10/141,370, mailed Sep. 21, 2004, 3 pages.

United States Patent and Trademark Office, "Office communication," issued in connection with U.S. Appl. No. 10/141,370, mailed Sep. 10, 2003, 15 pages.

United States Patent and Trademark Office, "Notice of Allowance and Fee(s) Due," issued in connection with U.S. Appl. No. 11/359,822, mailed Sep. 25, 2009, 10 pages.

United States Patent and Trademark Office, "Office communication," issued in connection with U.S. Appl. No. 11/359,822, mailed Apr. 22, 2009, 18 pages.

United States Patent and Trademark Office, "Office communication," issued in connection with U.S. Appl. No. 11/359,822, mailed Sep. 15, 2008, 26 pages.

Khalil et al., "Analysis and Traffic Characterization of a Wide Area Network," 1993, IEEE, pp. 1829-1835.

European Patent Office, Communication in connection with European Patent Application No. 03733936.3 (corresponding to PCT Application No. PCT/US03/13949), dated Jan. 13, 2010, 7 pages.

Gilardi, et al, "A proposal for an Ethernet-over-WDM Wide Area Multiplexing Architecture", IEEE International Conference on Communications, Apr. 28-May 2, 2002, New York, NY, vol. 4, pp. 2137-2141. (5 pages).

European Patent Office, "Extended European Search Report" issued in connection with European Patent Application No. 10185351.3, dated Mar. 25, 2011. (9 pages).

Canadian Patent Office, "Office Action" issued in connection with Canadian Patent Application No. 2,484,224, dated Jan. 25, 2011. (3 pages).

* cited by examiner

ETHERNET WIDE AREA NETWORKS AND METHODS

RELATED APPLICATIONS

This patent arises from a continuation of U.S. patent application Ser. No. 11/359,822, which was filed on Feb. 22, 2006 (now U.S. Pat. No. 7,633,951) and is a continuation of U.S. patent application Ser. No. 10/141,370, which was filed on May 8, 2002 (now U.S. Pat. No. 7,046,671). Both U.S. patent application Ser. Nos. 11/359,822 and 10/141,370 are hereby incorporated by reference in their entireties.

FIELD OF THE DISCLOSURE

The present disclosure relates generally to wide area networks and more particularly to Ethernet wide area networks and methods.

BACKGROUND

Ethernet (IEEE 802.1D(2)) is the technology that dominates the local area networking market. As a result this technology is inexpensive and well known by most users. There has been an interest in using Ethernet technology for wide area networks. Unfortunately the technology purposefully has a number of built-in limitations. For instance, IEEE 802.1D(2) limits the maximum diameter as seven hubs. When the number of hubs exceeds the maximum diameter, the topology updates sent using BPDU (Broadcast Protocol Data Units) packets may never reach their intended nodes. As a result, such nodes may become isolated even though they are physically connected to the network. Another problem arises due to the MAC (Medium Access Control) address awareness requirements. Each bridge node in a spanning tree must be aware of all the MAC addresses and their locations in the spanning tree. In a wide area network (WAN) this results in the storage of huge numbers of MAC addresses and becomes technically and economically infeasible for large WANs. Thus there exists a need for an Ethernet wide area network and method that overcomes these limitations.

DETAILED DESCRIPTION

An Ethernet wide area network has a number of interconnected network Ethernet switches. A first local area network has a first local area Ethernet switch and is connected to one of the interconnected network Ethernet switches. A second local area network has a second local area Ethernet switch connected to a second of the interconnected network Ethernet switches. The network Ethernet switches include a translation table from a network address to a MAC address. This table allows for translation between network addresses and MAC addresses and this reduces the size of the spanning tree.

Figure 1:
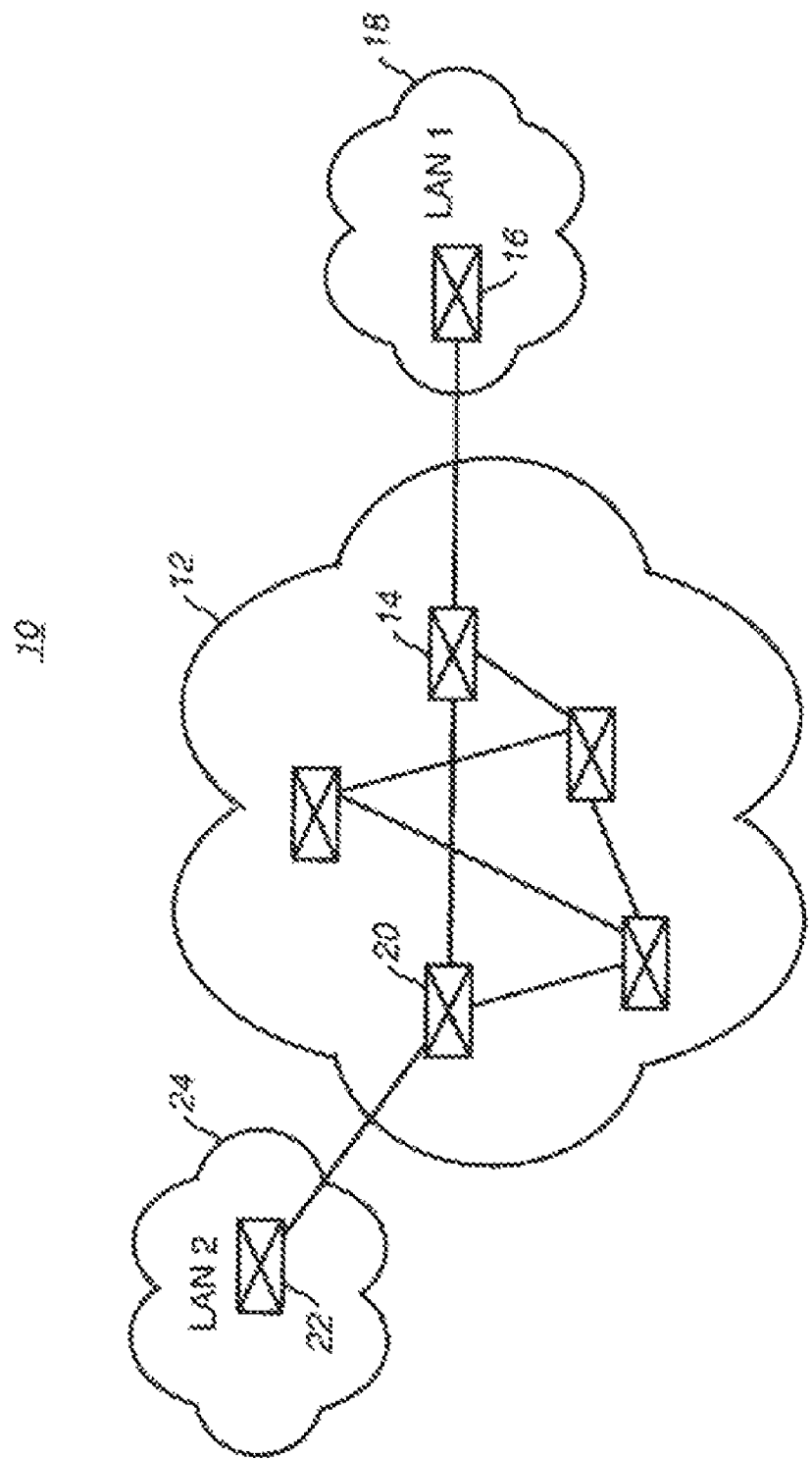
FIG. 1 is a block diagram of an Ethernet wide area network in accordance with one embodiment of the invention.

FIG. 1 is a block diagram of an Ethernet wide area network 10 in accordance with one embodiment of the invention. The Ethernet wide area network 10 has a plurality of interconnected network Ethernet switches 12. One 14 of the plurality of interconnected network Ethernet switches 12 is connected to a first local area Ethernet switch 16 in a first local area network 18. A second 20 of the plurality of interconnected network Ethernet switches 12 is connected to a second local area Ethernet switch 22 in a second local area network 24. The system 10 allows for an Ethernet network across large distances (national, international) and allows for more than seven hubs. This is made possible in part by the adaptations of the Ethernet switches in wide area network 12. The wide area network may be a service provider that allows multiple customers to setup nationwide, international or large Ethernet networks.

Figure 2:
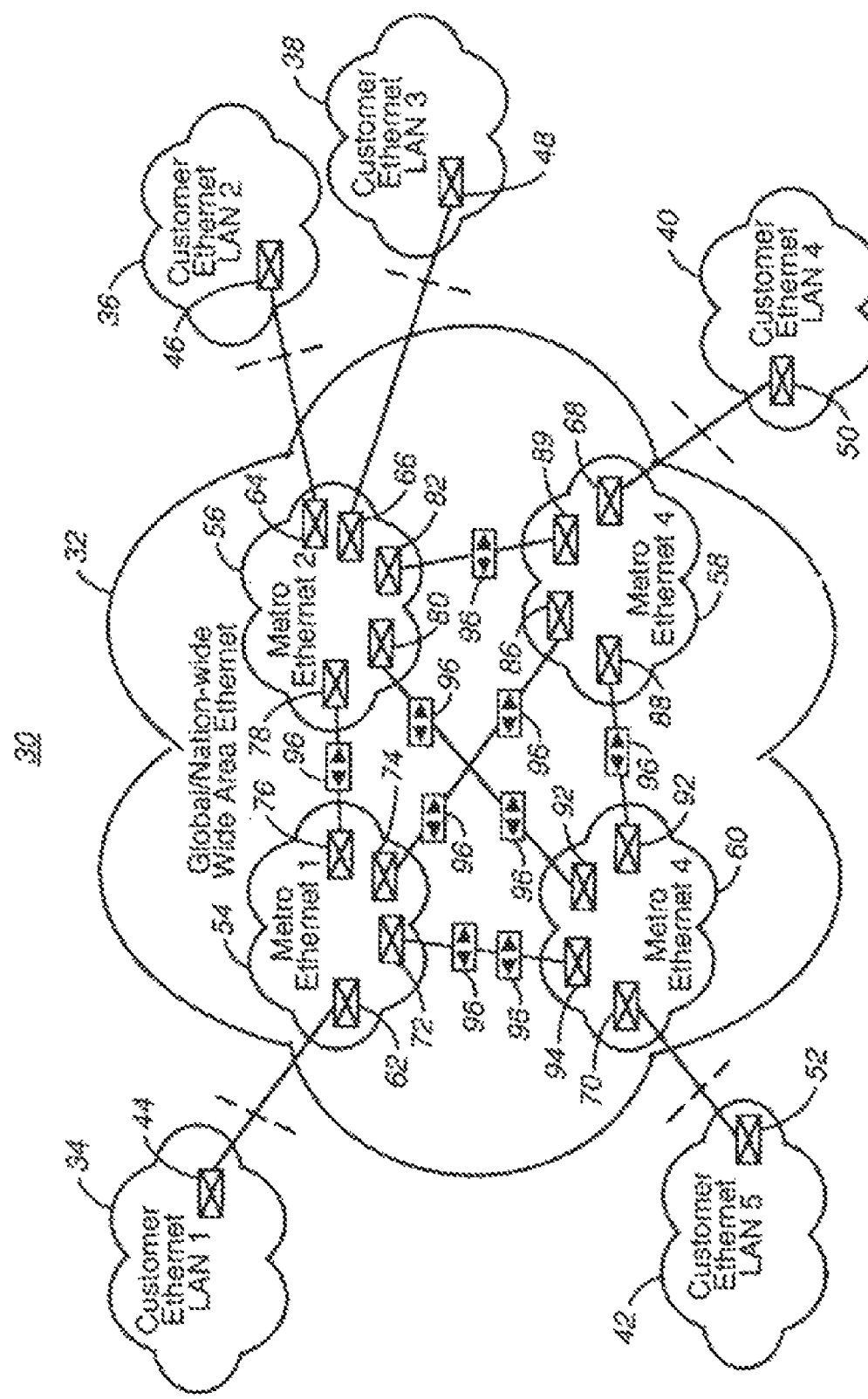
FIG. 2 is a block diagram of an Ethernet wide area network in accordance with one embodiment of the invention.

FIG. 2 is a block diagram of an Ethernet wide area network 30 in accordance with one embodiment of the invention. The Ethernet network 30 has a global wide area network (WAN) 32. The global Ethernet WAN 32 may be a service providers network that is leased out to users. Customers connect their Ethernet local area networks (LAN) 34, 36, 38, 40, 42 to the global Ethernet WAN 32. The LANs 34, 36, 38, 40, 42 each have an Ethernet switch 44, 46, 48, 50, 52 that provides the connection to the global WAN 32. The global WAN 32 is physically comprised of a plurality of metropolitan Ethernets 54, 56, 58, 60. Within the metropolitan Ethernets 54, 56, 58, 60 the topology is not shown. The metropolitan Ethernets 54, 56, 58, 60 have service interface Ethernet switches 62, 64, 66, 68, 70 and network interface Ethernet switches 72, 74, 78, 80, 82, 84, 86, 88, 90, 92, 94. The service interface Ethernet switches 62, 64, 66, 68, 70 connect to the customer Ethernet switches 44, 46, 48, 50, 52. The network interface Ethernet switches 72, 74, 78, 80, 82, 84, 86, 88, 90, 92, 94 connect the metropolitan Ethernet networks 54, 56, 58, 60. The current gigabit optical Ethernet standard requires an optical signal repeater for two Ethernet switches separated by over 80 Km. A number of optical signal repeaters 96 are shown connecting the metropolitan Ethernet networks 54, 56, 58, 60. Note that more than a single optical signal repeater 96 may be required to connect two Ethernet switches.

Figure 3:
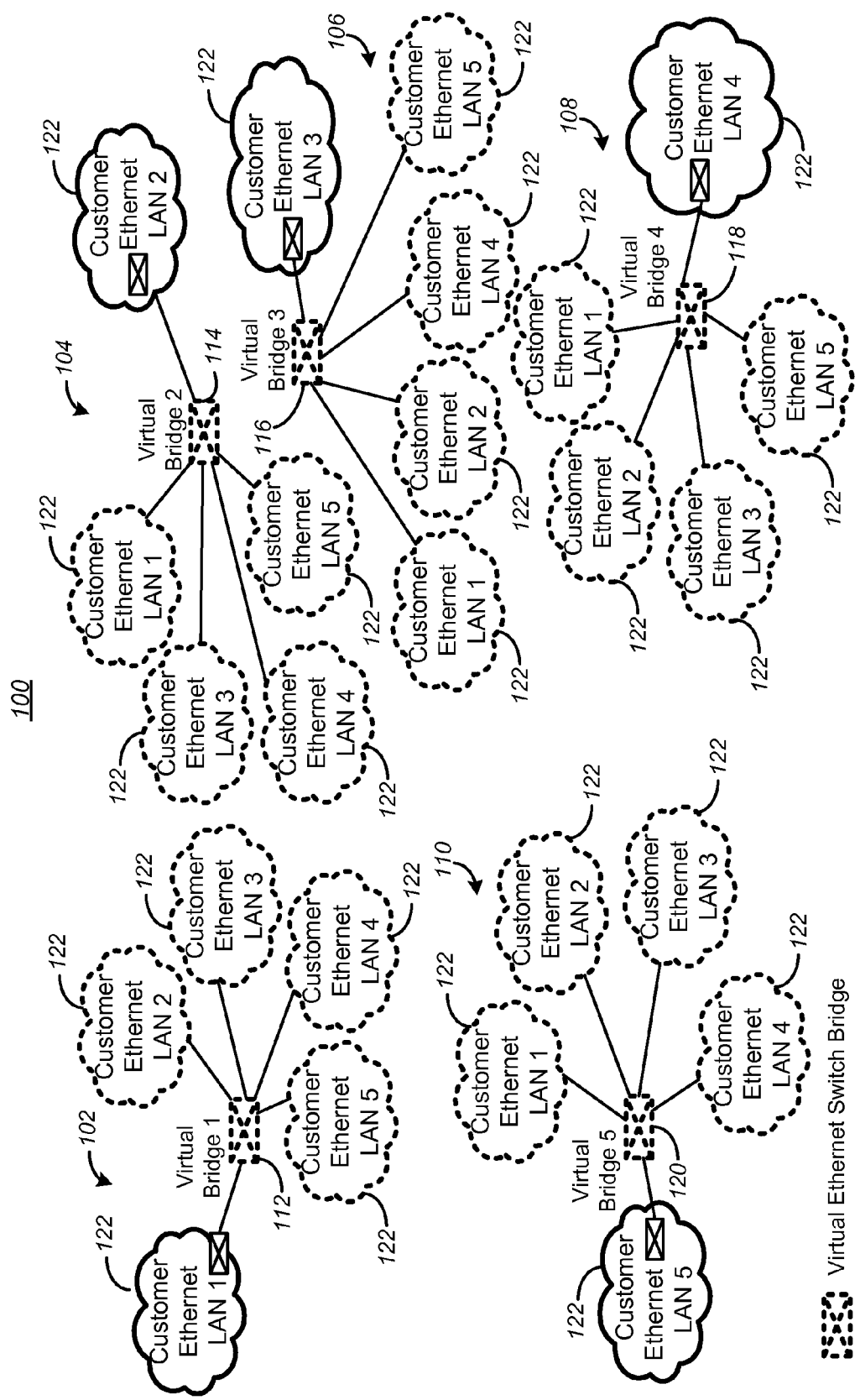
FIG. 3 is a conceptual drawing of an Ethernet wide area network service in accordance with one embodiment of the invention.

FIG. 3 is a conceptual drawing of an Ethernet wide area network service 100 in accordance with one embodiment of the invention. This drawing depicts the Ethernet wide area service from an end user point of view. The end user sees a number of separate Ethernet wide area networks 102, 104, 106, 108, 110. Each customers' Ethernet WAN has a virtual Ethernet switch or bridge (virtual bridge) 112, 114, 116, 118, 120 that connects the customers separate local area networks (LANs) 122. The virtual bridge 112, 114, 116, 118, 120 participates in the customer LAN bridging operations (e.g., the spanning tree-based topology calculation—in a non-intrusive manner). The virtual bridge will not compete with the root node of the spanning tree in the customer LAN. The far end LANs appear to be connected directly to the virtual bridge. The physical topology of the metropolitan Ethernet segments and the global Ethernet segments are totally transparent to the customer Ethernet LAN.

Figure 4:
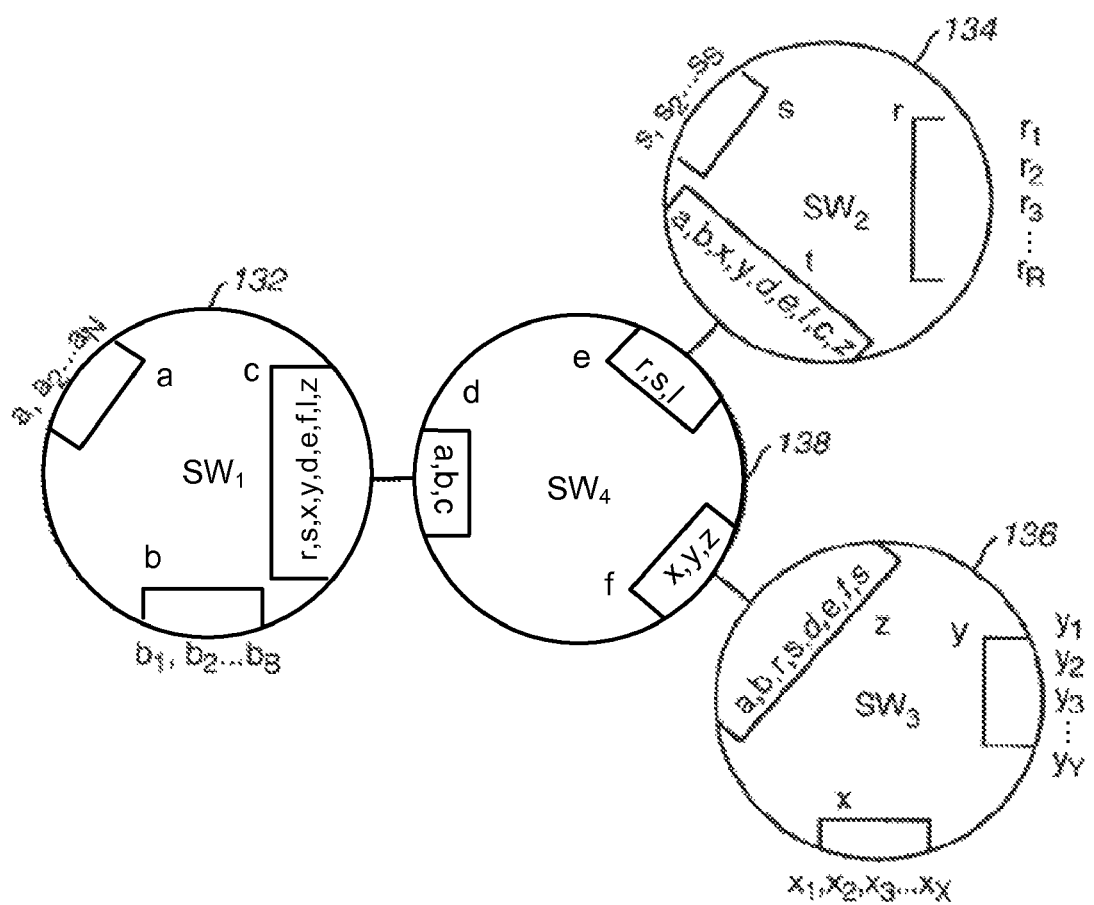
FIG. 4 is an architectural diagram of an Ethernet wide area network in accordance with one embodiment of the invention.

FIG. 4 is an architectural diagram of an Ethernet wide area network 130 in accordance with one embodiment of the invention. In this diagram each circle represents a WAN Ethernet switch (plurality of interconnected network Ethernet switches) 132, 134, 136, 138. The MAC address of the interfaces are designated a, b, c, d, e, f, r, s, t, x, y z. The service interfaces are a, b, s, r, x, y and the network interfaces are c, d, e, f, t, z. Next to the interfaces are the MAC addresses the interface has to recognize. The addresses $a_1, \ldots, a_A$, $b_1, \ldots, b_B, r_1, \ldots, r_R, s_1, \ldots, s_S, x_1, \ldots, x_x,$ and $y_1, \ldots, y_Y$ represent the MAC addresses of the host stations in the subscriber (user) environment. Each service interface a, b, s, r, x, y blocks any BPDU (Broadcast Protocol Data Units) that originated from the LAN segments to the WAN segments. In addition the service interfaces also block the BPDU originated from the WAN segment to the connected LANs. The service interfaces do exchange BPDUs that are necessary to create a virtual bridge in the WAN to the LAN. There is no exchange of BPDUs between the connected LAN segments.

Figure 5:
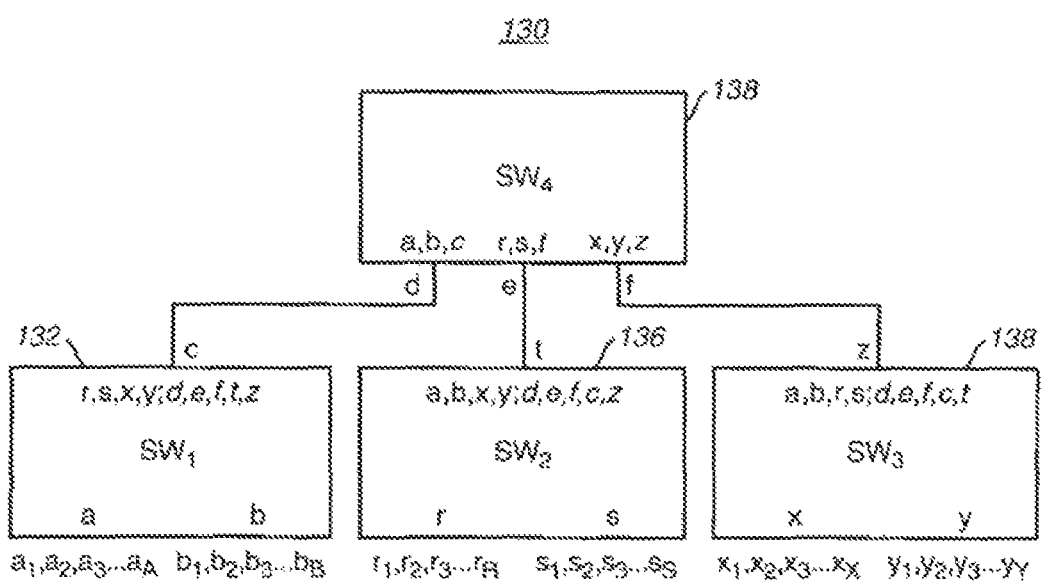
FIG. 5 is a hierarchical diagram of an Ethernet wide area network in accordance with one embodiment of the invention.

FIG. 5 is a hierarchical diagram of an Ethernet wide area network 130 in accordance with one embodiment of the invention. This diagram is similar to FIG. 4 and shows a spanning tree representation of the network of FIG. 4. Switch (SW4) 138 is the root node switch for the WAN Ethernet network. Each LAN network has its own root node. This reduces the complexity and size of the spanning tree for the networks. Note that none of the host MAC addresses from the subscriber LANs needs to appear in the spanning tree of the WAN. The only MAC addresses known explicitly in the WAN spanning tree are the MAC addresses of the service interfaces, trunk interfaces and bridge nodes. This significantly reduces the number of MAC addresses that are required to be learned by the WAN network elements and LAN network elements. All of the MAC addresses in the subscriber environment are transparent to WAN and do not need to be learned in the entire service provider network. They are registered only at the service interface on an individual subscriber basis.

Figure 6:
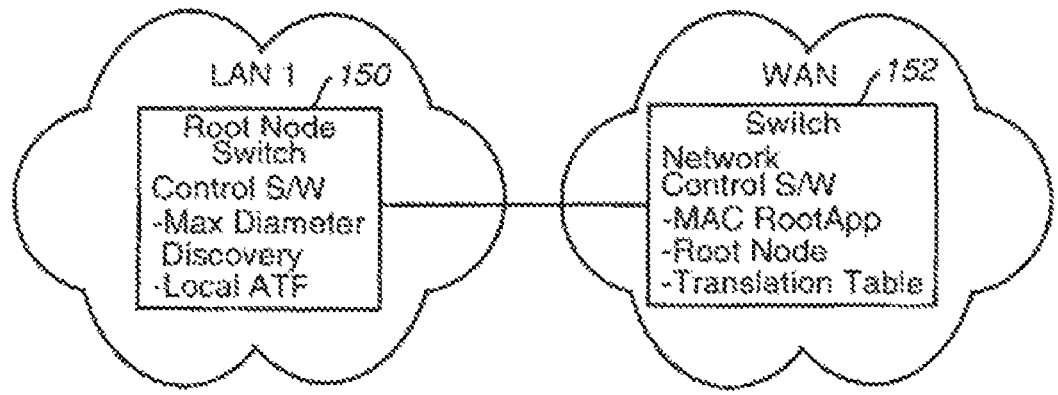
FIG. 6 is block diagram of a root node Ethernet switch connected to a network Ethernet switch in accordance with one embodiment of the invention.

FIG. 6 is block diagram of a root node Ethernet switch 150 connected to a network Ethernet switch 152 in accordance with one embodiment of the invention. The root node Ethernet switch 150 contains a control software that performs a maximum diameter discovery function and a local ATF (Address Translation Function). The network Ethernet switch 152 has network control software that performs a MAC addresses re-mapping function, a root node non-competition function and has a translation table. The maximum discovery algorithm starts by forming a broadcast PDU at each of the root bridge in a LAN. This broadcast PDU is designated with a specific syntax where the root bridge identifier and an initial hub count, start with 0. The broadcast PDU is sent to every nodes in the network as an inquiry. In addition, the broadcast PDU also carries a specific protocol type to signal the receipt of the packet type. At each stage of the spanning tree, the forward broadcast operations replicate the PDU to all sub-trees and increment the hub count by one. This broadcast eventually reaches a leaf bridge of the spanning tree. Each leaf bridge node responds to the root bridge node with a PDU that contains the final hub counts. As the root bridge gathers the replies on the hub counts on its first level branch basis, it can derive the maximum diameter of the network by adding the largest hub counts and the second largest hub counts from all its sub-tree branches.

After the root node discovers its maximum diameter, the value is recorded at the root node and can propagate to all other bridge nodes on a request basis. The maximum diameter discovery algorithm may be executed periodically depending on the frequency of the network topology changes. In another embodiment, a timer governs the frequency of the execution of this algorithm. In another embodiment, the algorithm is executed every time the spanning tree is recalculated or any new bridge node participates in the bridged network. A delay timer postpones this discovery execution until the spanning tree converges in one embodiment. This avoids unnecessary overload of broadcast traffic on the network. The same diameter discovery algorithm is executed in the WAN to determine the diameter of the WAN.

Any node may request the root node to provide the maximum network diameter via a simple inquiry protocol. A bridge node receives a BPDU propagated from the root bridge that has the root bridge address. A specific inquiry PDU is formed to learn the maximum diameter information from the root. This PDU has a protocol identifier that signals the root of the inquiry and a bridge identifier that identifies the initiating bridge node. The return PDU answers the maximum diameter and forwards it to the originating bridge node of the inquiry.

At each WAN service interface, the maximum diameter of the connecting LAN must be registered with the WAN. The service interface, which behaves as a virtual bridge node, should trigger the diameter discovery with the root node in LAN.

The service interface is responsible to relay and respond to the root node the diameter of the virtual bridge that represents the WAN transparent LAN services. All service interfaces should have updated diameters of the connected LANs. Each service interface may request the diameter from the WAN.

The virtual bridge diameter calculation is based on the following set of parameters according to IEEE 802.1D and IEEE 802.1w: WAN diameters; near-end LAN maximum diameter; far-end LAN diameters; default hello time; maximum bridge transit delay; maximum BPDU transmission delay; maximum message age increment overestimate; and default hold time.

The local address translation function involves mapping a MAC address to a network address (e.g., IP address).

The root node non-competition function is a function that selects a MAC address of a service interface connected to a LAN root node to have a lower priority than the root node.

The translation table is a mapping between a MAC address to a network address (e.g., IP address).

The MAC address re-mapping function includes replacing a source host MAC address at a service interface with an ingress service interface MAC address for an inbound packet. Note an inbound packet is a packet headed from a LAN to the WAN. The MAC address re-mapping function further includes replacing an egress service interface MAC address with a destination host MAC address. This re-mapping function reduces the number of required MAC address that need to be learned. The re-mapping requires the network address of the destination in order to perform the re-mapping.

Figure 7:
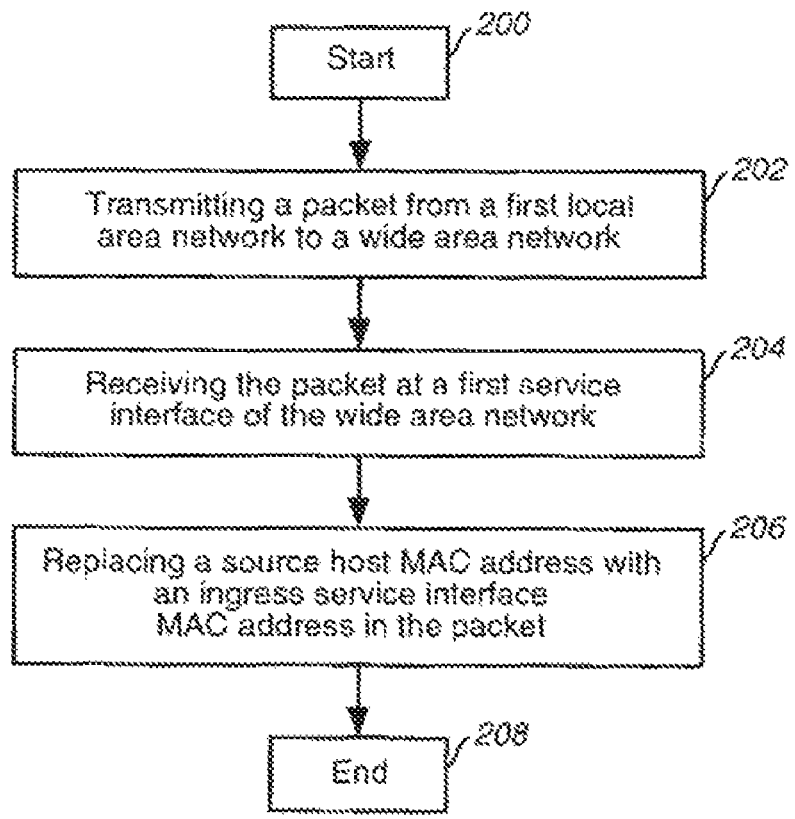
FIG. 7 is a flow chart of the steps used in a method of operating an Ethernet wide area network in accordance with one embodiment of the invention.

FIG. 7 is a flow chart of the steps used in a method of operating an Ethernet wide area network in accordance with one embodiment of the invention. The process starts, step 200, by transmitting a packet from a first local area network to a wide area network at step 202. The packet is received at a first service interface of the wide area network at step 204. At step 206 the source host MAC address is replaced with an ingress service interface MAC address in the packet which ends the process at step 208. In one embodiment, the packet is transmitted through the wide area network to a second service interface of the wide area network. In one embodiment, when the packet is transmitted the destination MAC address is replaced with a service interface MAC address. An egress service interface MAC address is replaced with a destination host MAC address. In one embodiment, replacing the egress service interface includes determining a destination host address. A lookup is performed in a translation table using the destination host address.

Thus there has been described an Ethernet wide area network and method that overcomes the limitation that do not allow nationwide or international Ethernet networks. In addition the invention overcomes the size limitations for Ethernet networks.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. For use with a first local area network having a first local area Ethernet switch and a second local area network having a second local area Ethernet switch, an Ethernet wide area network, comprising:
    a first network Ethernet switch having a first network interface and a first service interface, the first service interface to communicate with the first local area Ethernet switch;
    a second network Ethernet switch having a second network interface and a second service interface, the second service interface to communicate with the second local area Ethernet switch; and
    a root node network Ethernet switch having a third network interface to communicate with the first network interface of the first network Ethernet switch and a fourth network interface to communicate with the second network interface of the second network Ethernet switch, the first, second, third and fourth network interfaces to route packets from the first local area Ethernet switch to the second local area Ethernet switch without recognizing subscriber local area network medium access control addresses associated with either the first or second local area Ethernet switches.

2. The Ethernet wide area network of claim 1, wherein a first set of the subscriber local area network medium access control addresses are recognized at the first service interface and a second set of the subscriber local area network medium access control addresses are recognized at the second service interface.

3. The Ethernet wide area network of claim 1, wherein a translation table associated with the root node network Ethernet switch does not include any of the subscriber local area network medium access control addresses.

4. The Ethernet wide area network of claim 1, wherein the first service interface includes a translation table to translate a first one of the subscriber local area network medium access control addresses associated with a packet received from the first local area Ethernet switch to an ingress medium access control address associated with the first network Ethernet switch.

5. The Ethernet wide area network of claim 4, further comprising replacing a second one of the subscriber local area network medium access control addresses associated with the received packet with an egress medium access control address associated with the second network Ethernet switch.

6. The Ethernet wide area network of claim 5, further comprising translating the egress medium access control address to a destination medium access control address associated with the second local area Ethernet switch.

7. The Ethernet wide area network of claim 1, wherein the root node network Ethernet switch further comprises control software to adjust a transmission delay based on a maximum bridge diameter.

8. The Ethernet wide area network of claim 7, wherein the control software is to discover the maximum bridge diameter.

9. For use with a first local area network having a first local area Ethernet switch and a second local area network having a second local area Ethernet switch, an Ethernet wide area network, comprising:
    a first network Ethernet switch having a first network interface and a first service interface, the first service interface to communicate with the first local area Ethernet switch;
    a second network Ethernet switch having a second network interface and a second service interface, the second service interface to communicate with the second local area Ethernet switch; and
    a root node network Ethernet switch having a third network interface to communicate with the first network interface of the first network Ethernet switch and a fourth network interface to communicate with the second network interface of the second network Ethernet switch, a spanning tree associated with the first network Ethernet switch, the second network Ethernet switch and the root node network Ethernet switch including medium access control addresses for the first, second, third and fourth service interfaces, but not including medium access control addresses of either of the first or second local area Ethernet switches.

10. The Ethernet wide area network of claim 9, wherein a first set of the medium access control addresses of the first and second local area Ethernet switches are recognized at the first service interface and a second set of the medium access control addresses of the first and second local area Ethernet switches are recognized at the second service interface.

11. The Ethernet wide area network of claim 9, wherein a translation table associated with the root node network Ethernet switch does not include any of the medium access control addresses of the first and second local area Ethernet switches.

12. The Ethernet wide area network of claim 9, wherein the first service interface includes a translation table to translate a first one of the medium access control addresses of the first and second local area Ethernet switches associated with a packet received from the first local area Ethernet switch to an ingress medium access control address associated with the first network Ethernet switch.

13. The Ethernet wide area network of claim 12, further comprising replacing a second one of the medium access control addresses of the first and second local area Ethernet switches associated with the received packet with an egress medium access control address associated with the second network Ethernet switch.

14. The Ethernet wide area network of claim 13, further comprising translating the egress medium access control address to a destination medium access control address associated with the second local area Ethernet switch.

15. The Ethernet wide area network of claim 9, wherein the root node network Ethernet switch further comprises control software to adjust a transmission delay based on a maximum bridge diameter.

16. The Ethernet wide area network of claim 15, wherein the control software is to discover the maximum bridge diameter.

17. An Ethernet network, comprising:
a first local Ethernet network having a first plurality of hubs;
a second local area Ethernet network having a second plurality of hubs; and
a wide area Ethernet network communicatively coupling the first and second local area Ethernet networks, the wide area Ethernet network having a third plurality of hubs, a sum of the first, second and third plurality of hubs exceeding seven, wherein the first, second and third plurality of hubs send topology updates via broadcast protocol data unit packets.

18. The Ethernet network of claim 17, wherein a spanning tree associated with the wide area Ethernet network does not include medium access control addresses of either of the first or second local area Ethernet networks.

* * * * *